United States Patent
Esquivel et al.

(10) Patent No.: US 11,048,922 B2
(45) Date of Patent: Jun. 29, 2021

(54) GESTURE DETECTION USING COLOR SEGMENTATION

(71) Applicant: Intel Corporation, Santa Clara, CA (US)

(72) Inventors: Julio Cesar Zamora Esquivel, Guadalajara (MX); Jose Rodrigo Camacho Perez, Guadalajara (MY); Paulo Lopez Meyer, Guadalajara (MY); Hector Alfonso Cordourier Maruri, Guadalajara (MY); German Fabila Garcia, Guadalajara (MX); Jesus Adan Cruz Vargas, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 16/422,916

(22) Filed: May 24, 2019

(65) Prior Publication Data
US 2019/0278982 A1    Sep. 12, 2019

(51) Int. Cl.
*G06F 3/01*     (2006.01)
*G06T 7/90*     (2017.01)
*G06K 9/00*     (2006.01)

(52) U.S. Cl.
CPC ......... *G06K 9/00335* (2013.01); *G06F 3/017* (2013.01); *G06T 7/90* (2017.01)

(58) Field of Classification Search
None
See application file for complete search history.

(56) References Cited

U.S. PATENT DOCUMENTS

| | | | |
|---|---|---|---|
| 9,760,177 B1* | 9/2017 | Ramaswamy | G06F 3/0304 |
| 2010/0183221 A1* | 7/2010 | Ohtake | G06K 9/3233 |
| | | | 382/165 |
| 2014/0241570 A1* | 8/2014 | Onen | G06K 9/00389 |
| | | | 382/103 |
| 2016/0044222 A1* | 2/2016 | Endo | H04N 5/23218 |
| | | | 348/208.16 |
| 2016/0080662 A1* | 3/2016 | Saban | G06T 7/194 |
| | | | 348/77 |
| 2018/0314340 A1* | 11/2018 | Burr | G06F 3/017 |
| 2019/0295323 A1* | 9/2019 | Gutierrez | G06F 3/04815 |

* cited by examiner

*Primary Examiner* — Idowu O Osifade
(74) *Attorney, Agent, or Firm* — Schwabe, Williamson & Wyatt, P.C.

(57) ABSTRACT

In some embodiments, a method calculates a first color metric value from a detection window in a first image that is detected by a visual system. A second image of pixels is generated where the pixels include one or more second color metric values that meet the first color metric value within a threshold. The method compares the second image to an object. When the comparison meets a criterion, the method transitions from a first mode to a second mode. When the comparison does not meet the criterion, the method continues to operate in the first mode.

22 Claims, 8 Drawing Sheets

GESTURE DETECTION USING COLOR SEGMENTATION

BACKGROUND

Waking up a system may transition an application from a locked mode to an unlocked mode. A user may wake up the system using various methods. One method of waking up the system includes using a gesture, such as a hand gesture. A computer vision recognition system may be always on where the computer vision recognition system waits for any recognizable hand gesture to perform a task. This means that a significant amount of power is spent during non-active or idle periods waiting for the gesture. For example, some solutions based on neural networks process the entirety of all video frames that are detected, which may use a large amount of power in the system. This may degrade the performance of the system, such as using a large amount of battery power, which may be especially detrimental in smaller portable devices, such as smart glasses, smart phones, etc.

An alternative to the always-on approach may be to allow the user to interact with the system using built-in buttons, wake-up phrases, or other input options. The system may not be always on and processing a large amount of data. However, the use of the above interactions may require more effort from the user to wake up the system. To avoid having the computer vision recognition system in always-on mode, the wake-up routines typically require a button or combination of pressing buttons or a verbal wake-up phrase based on automatic speech recognition. For example, a user may speak a specific phrase designated to wake up the system or may press a designated key for unlocking the system. The use of these non-visual wake-up methods may require more effort from a user than simply using a gesture. Also, the need to wake up a system using a non-visual method may impact the natural flow of the system the user is using. For example, if the user is using a virtual reality (VR) system that a user mostly interacts with using visual gestures, having to press a button or speak a phrase may add an extra layer of complexity to the VR system and may be inconvenient to the user.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

A system provides a visual recognition process to transition from a first mode to a second mode. For example, upon visually detecting a hand gesture, the system may transition from a locked mode to an unlocked mode, or a stand-by mode to an active mode. The system may monitor frames (e.g., images) of video that are captured to determine whether an unlock command, such as a hand gesture, is present. For example, the system may calculate a color metric value of an object found in a detection window in the frame. The color metric value may be an average color that is calculated from the object that is present in the detection window. Then, the system generates a second image that includes pixels with color metric values that are similar to the calculated color metric value. For example, the system may connect pixels that have a color metric value that is close to the color metric value in the detection window. The connecting of pixels stops when pixels that have color metric values that are not within the threshold are encountered. This results in a second image of pixels that are connected together with similar color metric values.

Then, the system determines whether or not the second image is a gesture that is used to transition the system from the first mode to the second mode. For example, the system compares the second image to an object where the object is the designated command to transition the system from the first mode to the second mode. When the comparison meets a criterion, such as being considered similar to the object, the system transitions from the first mode to the second mode (e.g., from a locked mode to an unlocked mode). If the comparison does not meet the criterion, the system continues to operate in the first mode, such as the locked mode.

System Overview

Figure 1:
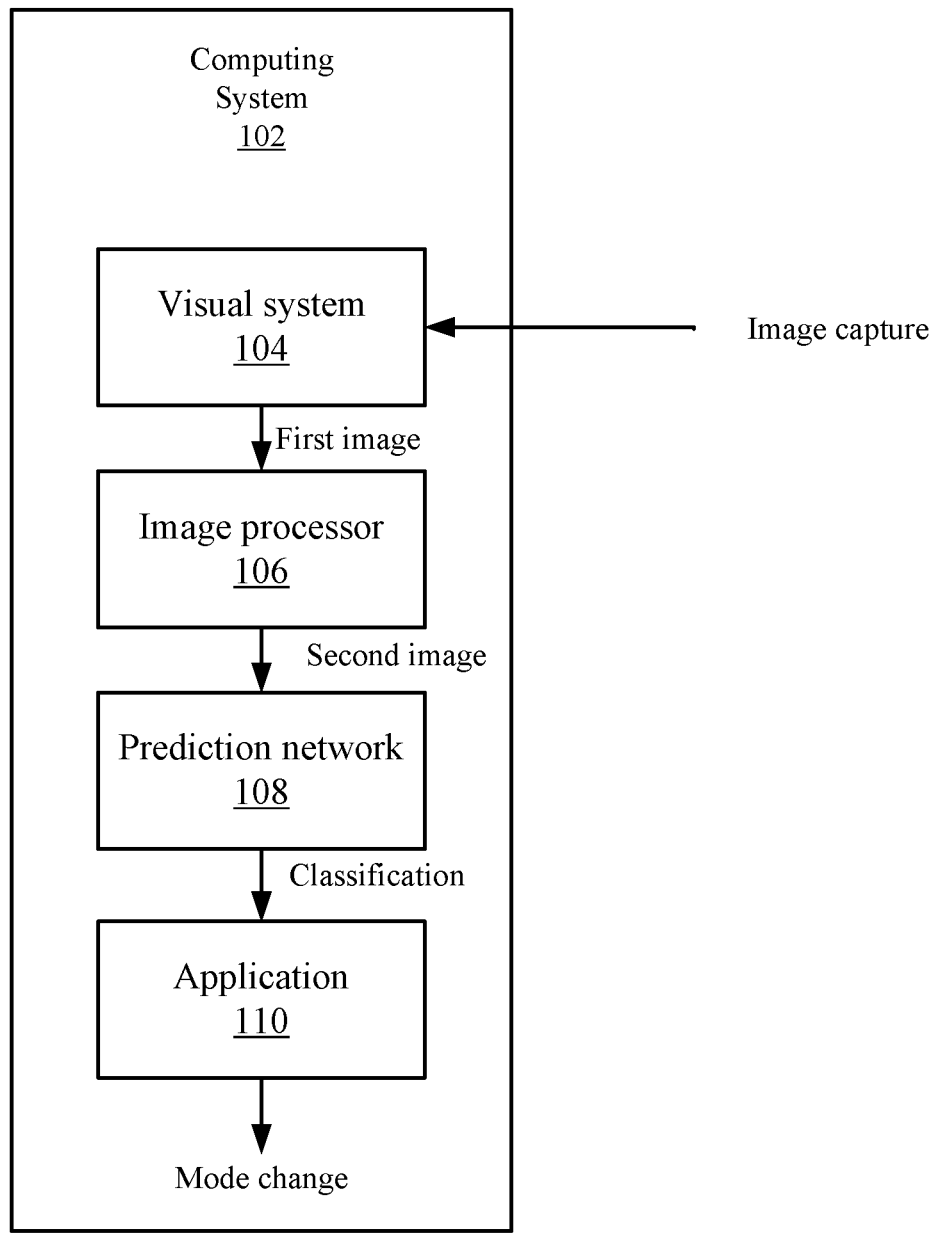
FIG. 1 depicts a simplified system for analyzing frames to determine whether to change modes according to some embodiments.

FIG. 1 depicts a simplified system 100 for analyzing frames to determine whether to change modes according to some embodiments. A computing system 102 may determine whether the mode change should be performed. In some embodiments, computing system 102 may include a head-mounted device (HMD). The head-mounted device may be coupled to another computing system or be a self-enclosed computing system. Computing system 102 may also be other systems that do not include a head-mounted device, such as other virtual reality or augmented reality systems, such as smart phones, gaming consoles, etc. Additionally, any computing systems that include visual capture systems, such as televisions and laptops may also be used. When computing system 102 is referred to, the functions of computing system 102 may be distributed among multiple devices.

Computing system 102 may include a computer vision recognition system that includes a visual system 104, an image processor 106, and prediction network 108. Visual system 104 that can capture video, which includes a sequence of images that may be referred to as frames. For example, visual system 104 may be a camera that captures video. The image may be a full N×M image frame F, where N is a width and M is a height of the frame. Frame F may be a full frame that is captured by visual system 104.

Image processor 106 may analyze the images. In some embodiments, each frame that is captured may be analyzed, but image processor 106 may analyze frames at different intervals.

Image processor 106 may receive the image and then determine a color metric value U. In some embodiments, image processor 106 calculates an average color metric value U inside of a section W of frame F. The average color metric value U may be an averaging of all values in section W. Also, other methods of calculating an "average" value may be appreciated, such as taking a median value or weighted average value. Section W may be referred to as a detection window, which may be a portion of the full N×M frame F. The detection window W may be pre-defined based on an application 110 that is running. For example, the size and specific location of the detection window W may be pre-defined depending on application 110. In other examples, detection window W may be dynamically determined, such as based on a size and/or location of an object in the frame, where the user is looking, etc. The color metric U may be referred to as a "skin tone" when detecting a hand gesture. It is noted that although a skin tone may be described, the skin tone does not have to be from human skin. Rather, a user may be using a glove that is a color, such as blue, and this color may be detected and used as a valid hand gesture. Also, although a hand gesture is described, it will be understood that a hand does not need to be used and other objects may be used, such as inanimate objects can be used to transition computing system 102 into a different mode.

Upon receiving the frame, image processor 106 then generates a second image G that will be evaluated. The second image G includes pixels that include a color metric value that is similar to the color metric value U found within the detection window W. The test for similarity may use different methods, such as using a threshold, exact match, etc. For example, all pixels that are connected together starting from one or more pixels within the detection window W may be included in the second image G. Image processor 106 may stop the connecting of pixels when neighboring pixels that include color metric values that are within a threshold to the color metric value U are no longer encountered thus meaning pixels that are not similar in color metric value are neighboring the second image G. This results in a second image that is segmented from the first image, such as a second image of a size R×P, where R represents a first dimension and P represents a second dimension. For example, R×P may be a bounding box to encompasses the second image, such as a rectangular box that surrounds an image of a hand. The bounding box may remove the content found in the first image that is outside of the hand. In other embodiments, some content found in the first image may be included in the R×P image. Also, an outline of the object detected, such as the hand may also be used instead of a bounding box.

As will be discussed in more detail below, image processor 106 may also perform other adjustments to the second image, such as performing a binary transformation and scaling the second image.

A prediction network 108 can then evaluate the second image to determine whether or not it is a valid pre-defined gesture. For example, prediction network 108 determines whether or not the second image is similar to a pre-defined hand gesture; however, the gesture may be any pre-defined visual information, such as a pre-defined inanimate object. A pre-defined hand gesture will be used for discussion purposes, but any pre-defined visual information or objects may be used. Also, a dynamically determined gesture may also be used.

Prediction network 108 may perform the evaluation using different processes. For example, prediction network 108 may be a neural network that classifies the second image to determine whether or not the second image is a pre-defined hand gesture or is not a pre-defined hand gesture. Other similar decision and classification processes may also be used, such as the outline of the second image may be compared to an outline of the pre-defined hand gesture and a distance calculation is used to determine whether or not the second image is within a threshold of the object.

In some embodiments, when a neural network is used, the neural network generates an evaluation that determines whether the second image is similar to a single object and does not use the color in the evaluation. For example, prediction network 108 does not need to evaluate whether the second image includes a correct color. Rather, the image processing of image processor 106 connected pixels similar color metric values and the system does not need to take into account whether or not a skin tone is received as prediction network 108 evaluates the second image for similarity to the pre-defined hand gesture without regard to color. This allows prediction network 108 to detect pre-defined hand gestures even when users are wearing gloves or other materials that mask skin tone, and also simplifies the calculation process as not analyzing for color removes calculations.

Prediction network 108 outputs a classification to an application 110. Application 110 may then perform an action based on the classification, such as transitioning from a first mode to a second mode. For example, when a valid hand gesture is received, then application 110 transitions from a locked mode to an unlocked mode. The locked mode may not allow the user to interact with application 110, but in the unlocked mode, the user can interact with application 110, such as to perform other gestures, control the user interface, such as move a head-mounted display around a 360 degree environment.

Figure 2:
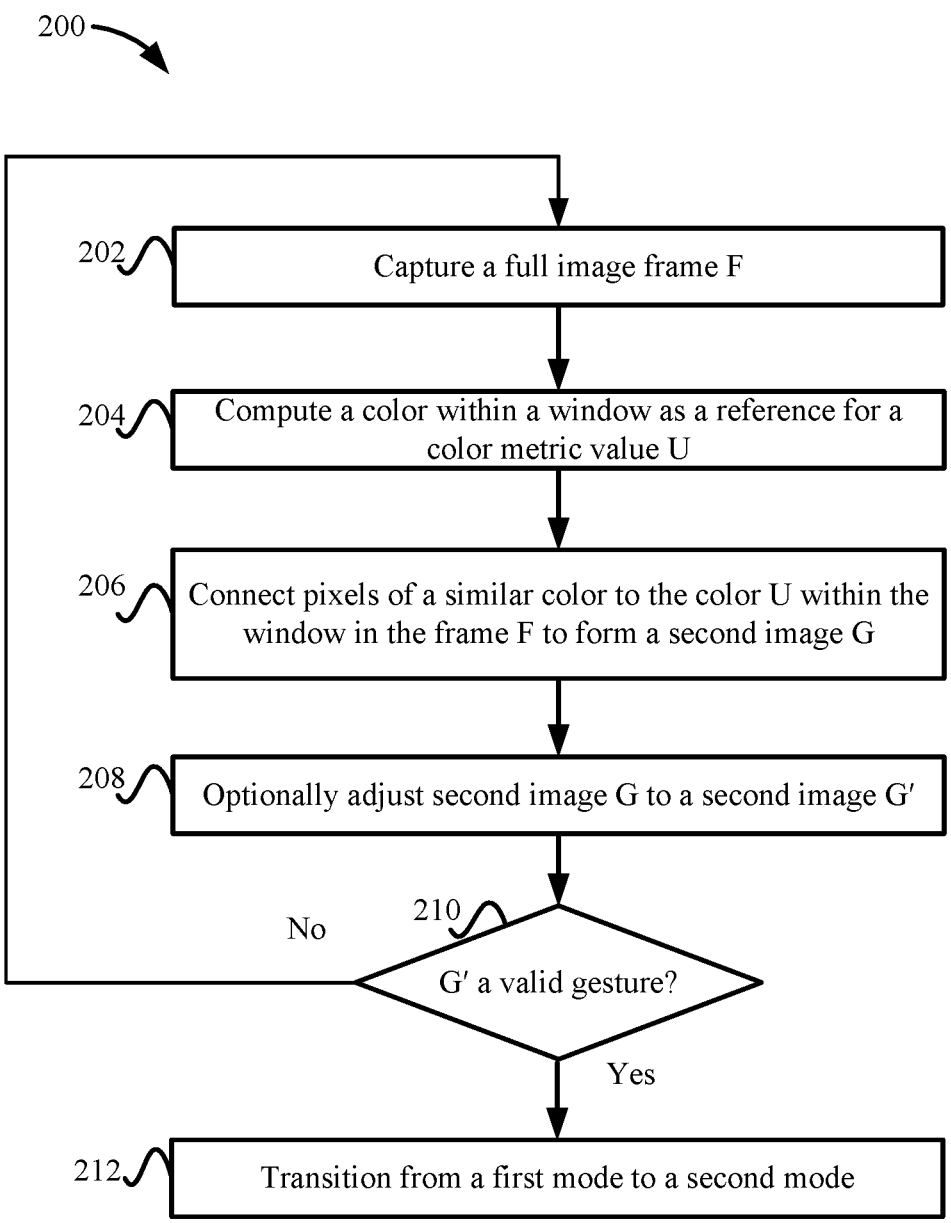
FIG. 2 depicts a flowchart detailing the mode transition process according to some embodiments.

Computing system 102 may use the second image to determine whether to transition modes. Although transitioning from a locked state to an unlocked state is described, the transition may be from other states, such as transitioning from a state of not performing an action to moving a pointer upon detecting the gesture, opening a file, or other actions that are performed. FIG. 2 depicts a flowchart 200 detailing the mode transition process according to some embodiments. At 202, visual system 104 captures a full image frame F. Then, at 204, image processor 106 computes a color within detection window W as a reference for a color metric value U. This may be referred to as a skin tone. At 206, image processor 106 connects pixels of a similar color to the color metric value U from within detection window W in frame F to form a segmented image G. The connection process will be described in more detail below.

At 208, image processor 106 may optionally adjust second image G to a third image G'. Some examples of adjustment can be adjusting second image G to a binary image. The second image may include variable conditions that vary in different images, such as the lighting conditions may change over time. The conversion to a binary image removes certain variable conditions that may have been captured in the second image G, such as lighting conditions. Second image G may also be of a variable size R×P that varies with every single frame captured depending on the size of the hand that is captured. In some examples, to avoid scaling problems and to make the prediction simpler, image processor 106 may re-size the second image G to a normalized size, such as an N×M image where N×M is a pre-defined size in which prediction network 108 is designed to analyze. For example, the N×M size may be a bounding box or other shape.

At 210, prediction network 108 determines if meets a criterion, such as the second image is a valid gesture. For example, the criterion may be if the detected is similar to a pre-defined gesture (e.g., a hand gesture) within a threshold, then at 212, application 110 transitions from a first mode to a second mode. The threshold may test whether the detected gesture forms a pattern that is within a pre-defined pattern. However, if the is not a valid gesture, the process reiterates to 202 where another full image frame F is captured and the process continues to test for whether the gesture is received.

Recognition Process

Figure 3A:
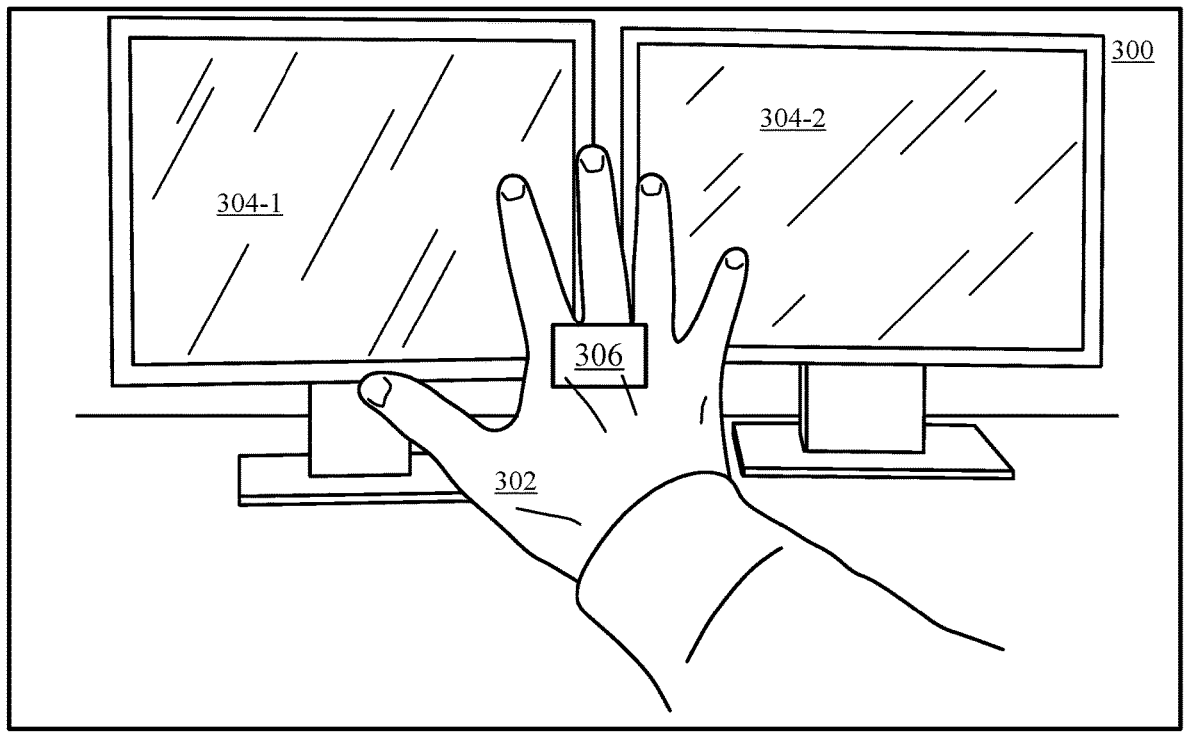
FIG. 3A depicts an example of a full frame according to some embodiments.

The recognition process to segment the first image into the second image will be described in more detail now. FIG. 3A depicts an example of a full frame 300 according to some embodiments. Frame 300 is an image that includes various content that could be captured, such as hand 302, other content 304-1, and other content 304-2. For example, hand 302 may be an image of the user's hand while other content 304-1 and 304-2 may be other objects, such as computer monitors in this example. In some embodiments, frame 300 is a full image that is captured from visual system 104.

A detection window 306 is shown in frame 300. The location may be predefined to a location where a user should place his/her hand to trigger the mode change. That is, to perform the mode change, a user may move his/her hand to have some portion of the hand within detection window 306. In some embodiments, computing system 102 may output a pattern in the user interface that allows the user to align his/her hand such that the detection window detects the proper skin tone.

Figure 3B:
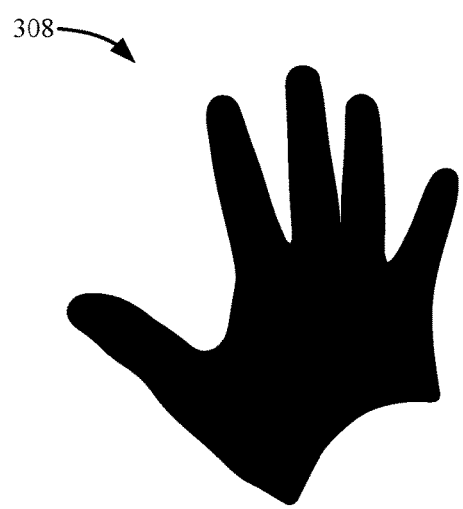
FIG. 3B depicts an example of the second image according to some embodiments.

Upon image processor 106 performing the segmentation to generate the second image, other content 304-1 and other content 304-2 may be removed. For example, FIG. 3B depicts an example of the second image according to some embodiments. As shown, a second image 308 includes pixels that were included in hand 302. Other content 304-1 and other content 304-2 are not included in second image 308. Although not shown visually, second image 308 includes pixels of a similar color metric value.

Connection Process

Figure 4A:
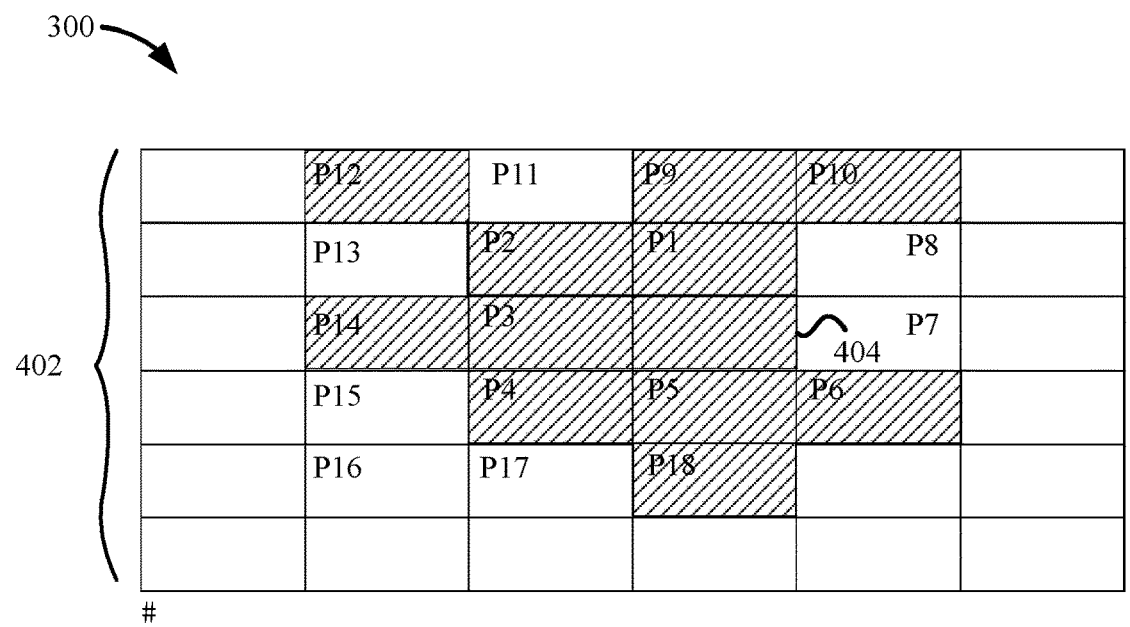
FIG. 4A depicts an example of the connection process to generate a second image according to some embodiments.

FIG. 4A depicts an example of the connection process to generate a second image 308 according to some embodiments. Full frame 300 may include multiple pixels 402 that are shown as blocks in FIG. 4A. Although the process may connect individual pixels together, other units may also be used, such as sections that include multiple pixels may be connected together. From detection window 306, image processor 106 may compute the average color metric value U. Then, starting from a reference point within detection window 306, such as a center point in detection window 306, image processor 106 starts connecting pixels together. A connection of pixels may be two pixels that may be neighboring pixels. A neighboring pixel may be a pixel that shares some coordinate space that is next to a coordinate space of another pixel, such as there may be left, right, up, down, and diagonal neighbors. Other types of neighbors may also be appreciated, such as a neighbor may be defined as a pixel that is within a number of pixels or a pre-defined distance to a current pixel being evaluated.

At 404, image processor 106 selects a pixel. Then, prediction network 108 determines whether neighboring pixels include a color metric value that is similar to the average color metric value U that was calculated for detection window 306. The pixels that include a color metric value that is similar (e.g., within a threshold) to the average color metric value U are shown with diagonal slashes in full frame 300. Pixels that include a color metric value that is not similar (e.g., not within a threshold) to the average color metric value U are shown without diagonal slashes in full frame 300.

Figure 4B:
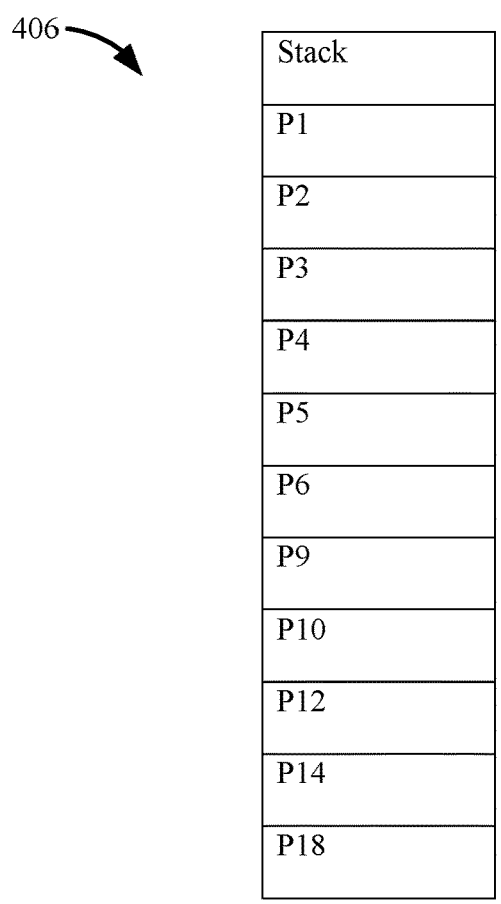
FIG. 4B depicts an example of a stack according to some embodiments.

Image processor 106 may use a stacking process, which inserts pixel identifiers into a stack when image processor 106 determines they are connected to another pixel. FIG. 4B depicts an example of a stack 406 according to some embodiments. Stack 406 may be a data structure that stores pixel identifiers. Referring to both FIG. 4A and FIG. 4B, image processor 106 evaluates pixels that are connected to pixel 404. In some embodiments, the connected pixels to pixel 404 are pixels P1 to P8, which all neighbor pixel 404. Image processor 106 then determines if the color metric value for each pixel is similar to the computed average color pixel value U from detection window 306. In this example, image processor 106 selects pixels P1, P2, P3, P4, P5, and P6 as being connected to pixel 404 and having a color metric value that is within a threshold of the average color metric value U. For example, the color metric value U may be 1.0 and pixels P1, P2, P3, P4, P5, and P6 have color metric values within 0.1 of the value 1.0. Image processor 106 determines that pixels P7 and P8 do not have a color metric value that is within a threshold of the average color metric value U. Accordingly, image processor 106 adds pixels P1, P2, P3, P4, P5, and P6 into stack 406. Image processor 106 may then move on to another pixel to determine other connected pixels. The next pixel may be determined in various ways, such as the next highest pixel identifier value, a randomly selected pixel, a pixel from a pre-defined neighboring position, etc. For example, starting at pixel P1, image processor 106 determines the connected pixels to pixel P1. The pixels in full frame 300 that have not yet been evaluated already include pixels P9, P10, and P11. Pixels P2, P3, pixel 404, pixel P7, and pixel P8 have already been evaluated and are not considered again by image processor 106.

Image processor 106 determines that pixels P9 and P10 include a color metric value similar to the average color metric value U and that pixel P11 does not include a color metric value similar to the average color metric value U. Accordingly, image processor 106 adds pixels P9 and P10 to stack 406 and not pixel P11. Image processor 106 continues analyzing pixels for neighboring pixels. For example, moving to a pixel P2, image processor 106 selects pixels P12 and P14 as neighboring pixels that include a color metric value that is similar to the average color metric value U. Image processor 106 adds pixels P12 and P14 to stack 406. Finally, image processor 106 adds pixel P18 to stack 406 as having a color metric value similar to the average color metric value U.

Figure 5:
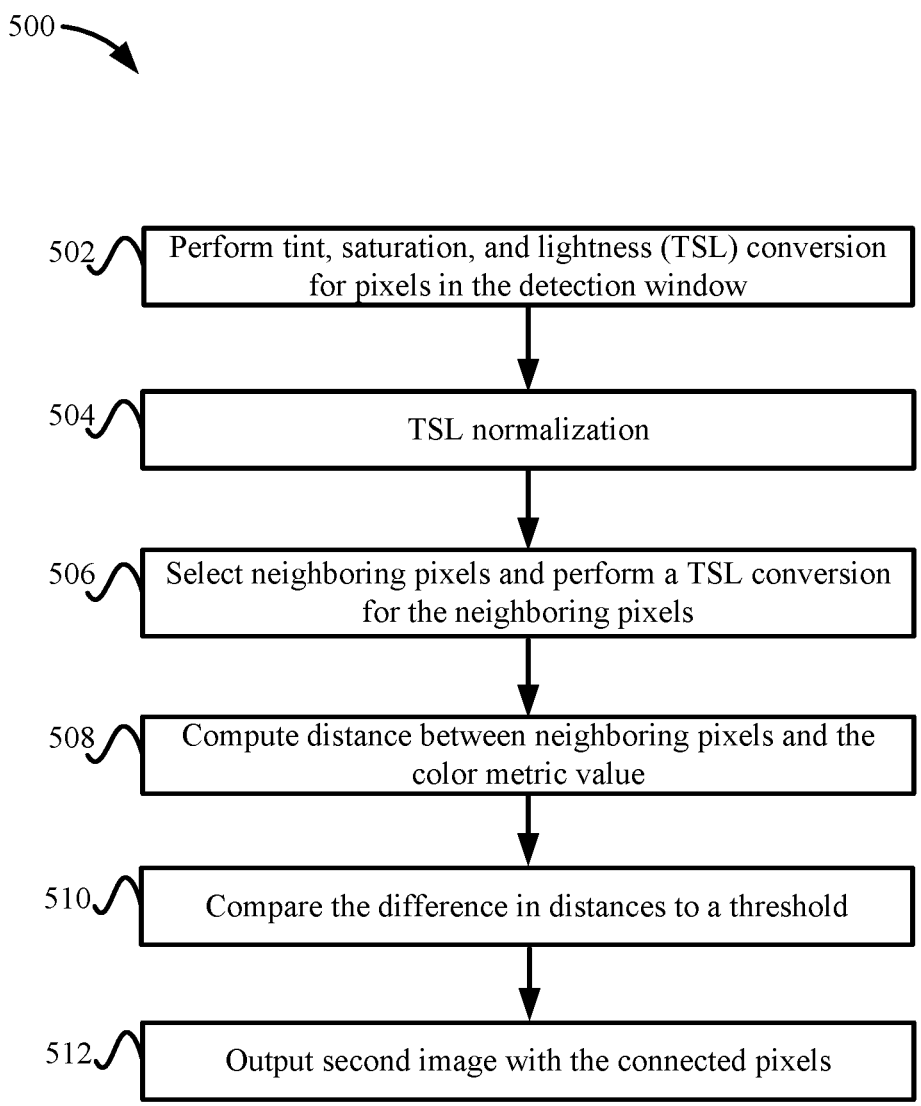
FIG. 5 depicts a more detailed example of connecting pixels according to some embodiments.

FIG. 5 depicts a more detailed example of connecting pixels according to some embodiments. In some embodiments, image processor 106 uses a color space of tint, saturation, and lightness because it allows for skin tone segmentation between a user's hand and other content. The TSL color space defines color as tint (e.g., the degree to which a stimulus can be described as similar to or different from another stimuli that are described as red, green, blue, yellow, and white), saturation (e.g., the colorfulness of a stimulus relative to its own brightness), and lightness (e.g., the brightness of a stimulus relative to a stimulus that appears white in similar viewing conditions). Although a TSL approach is used, other approaches may be used, such as using the red, green, blue color space.

In some embodiments, image processor 106 only performs the conversion for the required pixels that are analyzed and not the entire frame. In the process, at 502, image processor 106 performs a tint, saturation, and lightness conversion for pixels in the detection window. Image processor 106 may determine the average color metric for pixels in the detection window that have been subject to the TSL conversion, which yields an average color metric. The color metric may be a color distribution in the detection window in addition to an average color. The color distribution may be in a histogram that lists values for the TSL conversion. The average color may be an average of the TSL values.

At 504, image processor 106 performs a TSL normalization that normalizes the TSL values. The normalization may map colors from values of range (0,255) to a value range of (0,1), which is used by prediction network 108. Normalization may be optionally performed.

Next, at 506, image processor 106 selects neighboring pixels and can perform a TSL conversion for the neighboring pixels. By selecting neighboring pixels and performing the conversion, not all pixels will be converted in the frame, which saves computing resources and time. For example, pixels that lie outside of the detected gesture will not be converted. At 508, image processor 106 computes a distance from the neighboring pixels to the average color metric. For example, a distance may be a Mahalanobis distance that is given by the distance of an observation $x=(x_1, x_2, x_3, \ldots, x_N)$ from a set of observations with a mean $u=(u_1, u_2, u_3, \ldots, u_N)$ in a covariance matrix S defined as: $(x) = \sqrt{(x-u)S^{-1}(x-u)}$.

The above distance and covariance determine if a neighboring pixel's color metric is similar to the color metric value. The covariance may define the threshold of variance that may be allowed between the color metric value of the neighboring pixel and the average color metric value. Although the above distance calculation is described, other ways of comparing the distance or difference between color metrics may be used.

At 510, image processor 106 compares the difference in distances to a threshold, which may be defined by the covariance. The process of 506, 508, and 510 may be performed for each neighboring pixel until pixels that do not meet the threshold are found around the entire second image. Then, at 512, image processor 106 outputs a second image with the connected pixels. In the end, the second image includes adjacent pixels that are connected together and have a similar color metric value. Per frame, a single image is determined.

Process Enhancement

Figure 6:
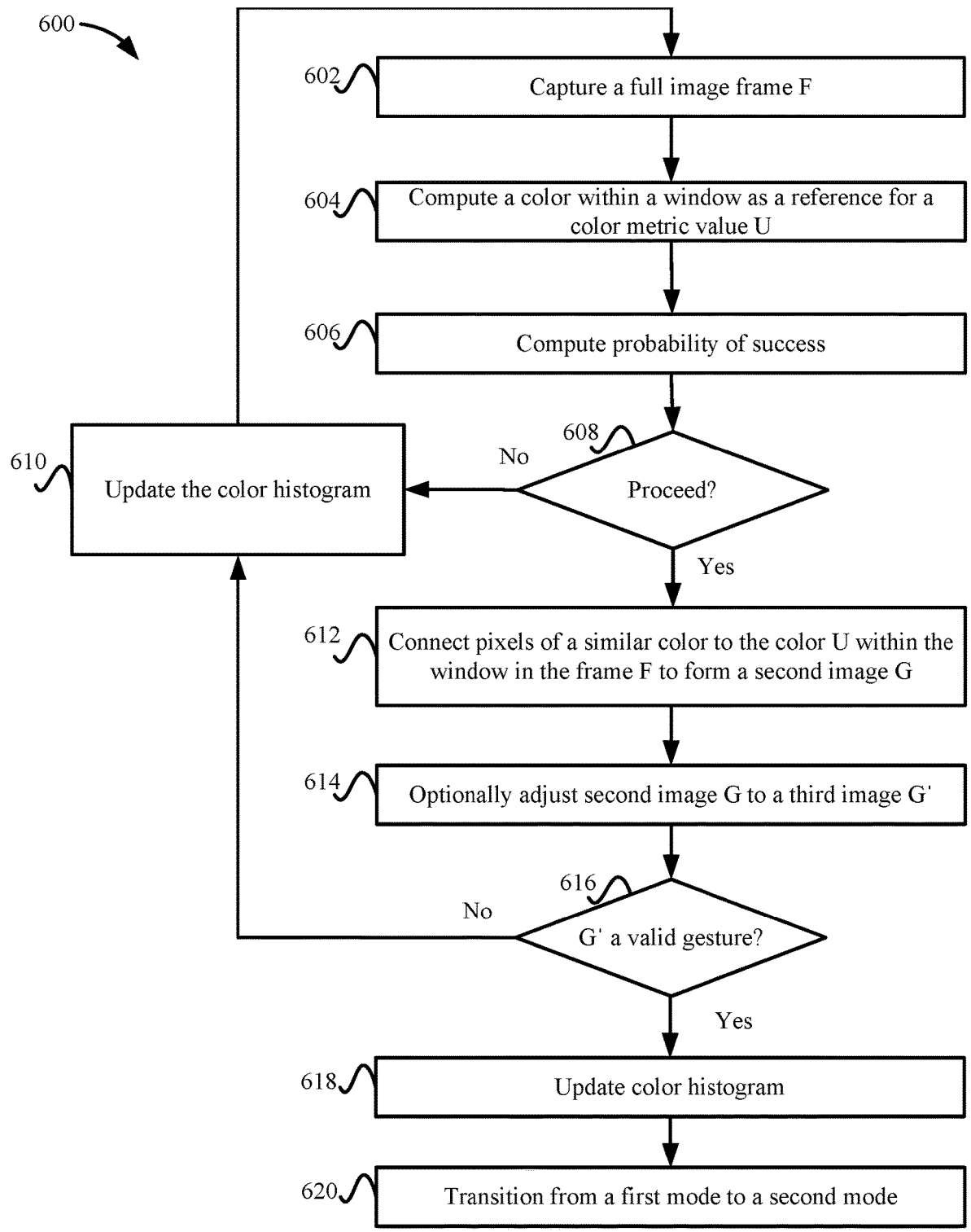
FIG. 6 depicts a simplified flowchart of a method for determining whether to transition from a first mode to a second mode using an optimization sub-routine according to some embodiments.

Image processor 106 may enhance the process to ever further lower the computational cost in some embodiments. FIG. 6 depicts a simplified flowchart 600 of a method for determining whether to transition from a first mode to a second mode using an optimization sub-routine according to some embodiments. The optimization may reduce the need to perform the analysis on every single frame. Rather, once a color metric value for a pixel in detection window 206 is obtained, image processor 106 may use a model to determine whether to proceed with the segmentation process to generate the second image based on the likelihood of the color metric value resulting in a valid gesture. That is, the segmentation process to generate the second image is performed for only statistically significant colors that have resulted in valid gestures in the past.

At 602, image processor 106 captures a full image frame F. Then, at 604, image processor 106 computes a color metric U within detection window 206 as a reference for a color metric value. At 606, image processor 106 computes a probability of success. That is, the probability of success is where the color metric value may result in a transition from the first mode to the second mode (e.g., a valid gesture is determined). The probability may be computed using different methods. At 608, image processor 106 determines whether to proceed or not with the further analysis. The probability of success will be described in more detail below. If image processor 106 decides not to proceed, at 610, image processor 106 may perform an adjustment to avoid blocking out a color from any consideration, such as adjusting a probability function, such as a color histogram. Although a color histogram is discussed, other probability functions may be used, such as performing conditional probability computations based on probability density functions. The color histogram describes colors that result in successful gestures, which are used to increase the probability P for that color. That is, when a color results in a valid gesture, image processor 106 may increase the value in the color histogram indicating that color resulted in a successful gesture. When a color results in an invalid gesture, then image processor 106 may adjust the value lower.

If image processor 106 proceeds, the process described at 612, 614, and 616 are similar to what was described at 306, 308, and 310 in FIG. 3 After determining whether the third image G' is a valid gesture or not, if there is a valid gesture at 618, image processor 106 updates the color histogram based on the third image G' if the gesture was valid. Then, at 620, similar to 312 in FIG. 3, application 110 transitions from a first mode to a second mode.

If third image G' was not a valid gesture, at 610, image processor 106 updates the color histogram to adjust the probability of that color resulting in an invalid gesture. That is, the applicable color in the color histogram may have its probability reduced.

Figure 7:
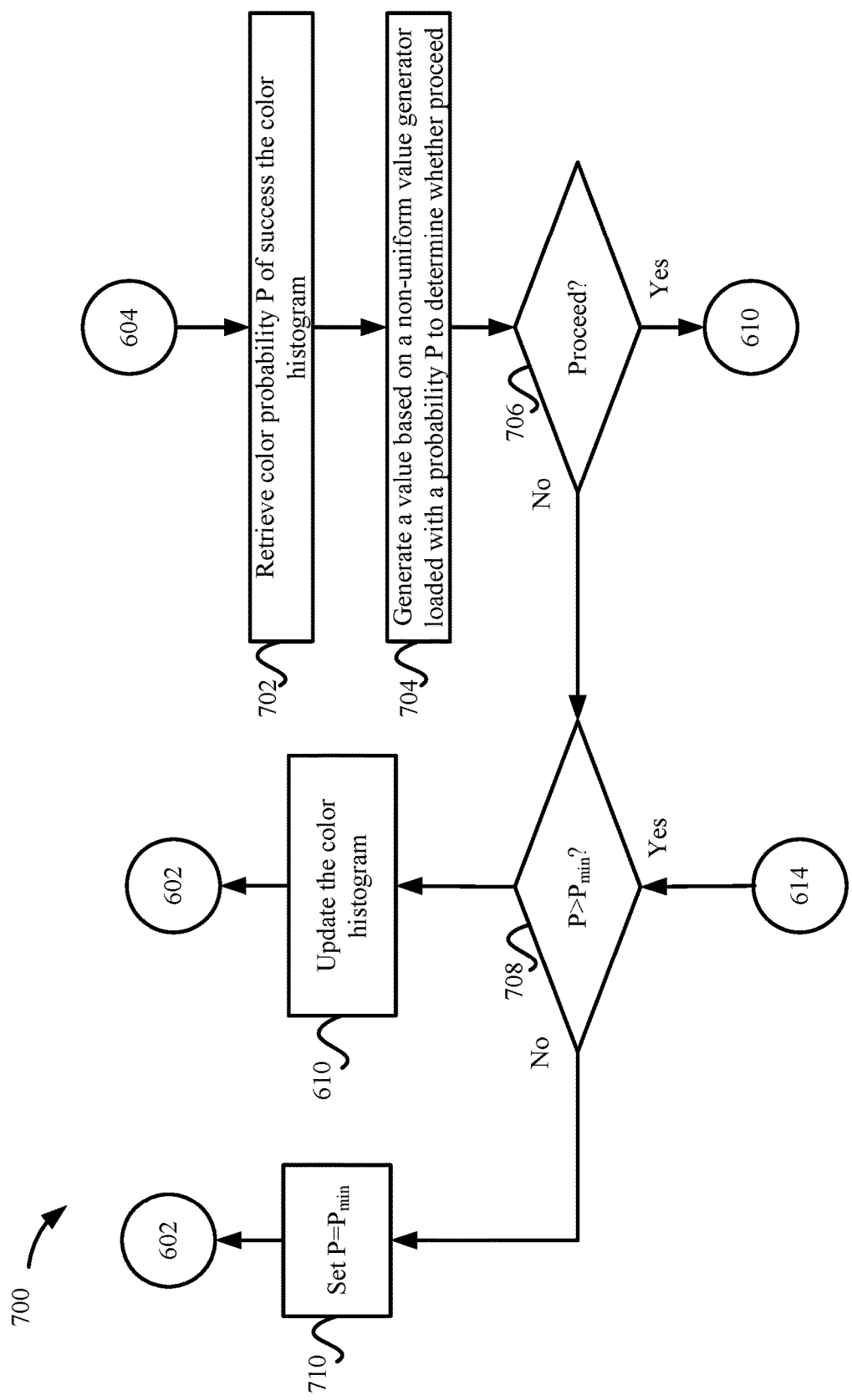
FIG. 7 depicts a simplified flowchart of a more detailed example of computing the probability of success according to some embodiments.

Computing the probability of success may be performed using different processes. FIG. 7 depicts a simplified flowchart 700 of a more detailed example of computing the probability of success according to some embodiments. At 702, image processor 106 retrieves a color probability P of success, such as from the color histogram. For example, the color metric value U calculated at 604 in FIG. 6 may be looked up in the color histogram to determine the probability P of success for that color. Then, at 704, image processor 106 may generate a value based on a non-uniform value generator loaded with a probability P to determine whether to proceed. The output of the non-uniform value generator may be weighted using the probability P. That is, if the probability P is higher to proceed, then it is more likely that the non-uniform value generator generates a value of to proceed than a value to not proceed. In some examples, a coin that generates two values may be simulated and loaded with a probability P that may weigh the chances of the two values occurring based on the probability P. Accordingly, the value may take a first value of one to proceed and a second value of zero to not proceed.

At 706, image processor 106 determines whether to proceed or not based on the value output by the non-uniform value generator. For example, if the value is a first value, image processor 106 proceeds to 610 in FIG. 6 to proceed with the segmentation process. If the value is a second value, image processor 106 does not proceed, and at 708, image processor 106 determines whether the probability P is greater than a minimum probability value $P_{min}$. Probability $P_{min}$ may be set to a value so colors may not be totally eliminated from consideration. That is, if a probability goes to zero for a color, then the non-uniform value generator would always generate a value that would not proceed with the color segmentation. Image processor 106 would set probability $P_{min}$ to a value to not allow the probability to go below probability $P_{min}$. Thus, at 710, if the probability P for that color in the color histogram is less than probability $P_{min}$, at 712, image processor 106 sets the probability P to be the value of probability $P_{min}$. The process proceeds to 602 in FIG. 6.

If the probability P is greater than the probability $P_{min}$, at 620, image processor 106 updates the color histogram considering image processor 106 did not proceed with the image segmentation. For example, image processor 106 may lower the probability of that color in the color histogram. The process then proceeds to 602 of FIG. 6.

Also, at 708, image processor 106 may determine whether the probability P is greater than the probability $P_{min}$ when it is determined that the second image is not a valid gesture from 614 in FIG. 6.

Conclusion

Accordingly, computing system 102 may reduce the processing from a large amount of evaluations per frame to only one evaluation. The single evaluation may evaluate whether the second image matches a gesture that is pre-defined to indicate if a transition from a first mode to a second mode is desired. Also, since the color is obtained in every frame, each frame takes into account changing light conditions and changing skin color. This means that the process is robust enough to not be affected by color, such as if the user is wearing gloves of a different color than skin tone. This means that the process is skin tone agnostic and that different skin tones may be detected in addition to detecting colors that are naturally known skin tones.

Prediction network 108 may be trained to detect only a single gesture. However, prediction network 108 may be trained to detect multiple gestures. Additionally, computing system 102 may use a first prediction network 108 that is designed to detect a single gesture to transition from the first mode to the second mode. However, when transitioning into the second mode, computing system 102 may use a different prediction network that may be able to recognize a larger number of hand gestures according to application 110. For example, application 110 may have other hand gestures that perform different actions while in the unlocked mode, such as using two hands simultaneously to navigate the user interface. Accordingly, by performing a process that generates a second image that extracts a single object per frame and performs an analysis for only one object, computing system 102 may use less computing resources in determining whether to transition modes.

In some embodiments, a method for analyzing images is provided. The method includes: calculating, by a computing device, a first color metric value from a detection window in a first image that is detected by a visual system; generating, by the computing device, a second image of pixels, wherein the pixels in the second image of pixels include one or more second color metric values that meet the first color metric value within a threshold; comparing, by the computing device, the second image of pixels to an object; when the comparison meets a criterion, transitioning, by the computing device, from a first mode to a second mode; and when the comparison does not meet the criterion, continuing, by the computing device, to operate in the first mode.

In some embodiments, the first color metric value includes an average color metric value from a set of colors in the detection window.

In some embodiments, the detection window is a pre-defined section within the first image.

In some embodiments, generating the second image of pixels includes: connecting pixels that include the second color metric value that meets the first color metric value within the threshold together to form the second image of pixels.

In some embodiments, generating the second image of pixels includes: stopping the connecting of pixels when no more pixels that include the second color metric value meet the first color metric value within the threshold are neighboring to pixels that form the second image of pixels.

In some embodiments, generating the second image of pixels includes: selecting a first pixel that includes the second color metric value that meets the first color metric value within the threshold; analyzing a first set of pixels that are coupled to the first pixel to determine a second set of pixels from the first set of pixels that include the second color metric value that meets the first color metric value within the threshold; and adding the second set of pixels to the second image of pixels.

In some embodiments, generating the second image of pixels includes: selecting a third set of pixels from the first set of pixels that include the second color metric value that meets the first color metric value within the threshold; and not adding the third set of pixels to the second image of pixels.

In some embodiments, generating the second image of pixels includes: selecting each of the second set of pixels; for each of the second set of pixels, analyzing a third set of pixels that are coupled to each of the second set of pixels to determine a fourth set of pixels from the third set of pixels that include the second color metric value that meets the first color metric value within the threshold; and adding the third set of pixels within the fourth set of pixels to the second image.

In some embodiments, comparing the second image to the object includes: transforming the second image to a binary image; and comparing the binary image to the object.

In some embodiments, comparing the second image to the object includes: resizing the second image; and comparing the resized second image to the object.

In some embodiments, comparing the second image to the object includes: determining whether the second image is similar to the object within a second threshold.

In some embodiments, comparing the second image to the object includes: not using the one or more second color metric values to determine whether the second image is similar to the object within a second threshold.

In some embodiments, the method includes: calculating a third color metric value from the detection window in a second image that is detected by the visual system; and continuing to operate in the first mode when a probability that the third color metric would result in a comparison that would not meet the criterion is above a second threshold.

In some embodiments, the first image includes a gesture, and the first mode is a locked mode and the second mode is an unlocked mode.

In some embodiments, a non-transitory computer-readable storage medium id provided having stored thereon computer executable instructions, which when executed by a computer device, cause the computer device to be operable for: calculating a first color metric value from a detection window in a first image that is detected by a visual system; generating a second image of pixels, wherein the pixels in the second image of pixels include one or more second color metric values that meet the first color metric value within a threshold; comparing the second image of pixels to an object; when the comparison meets a criterion, transitioning from a first mode to a second mode; and when the comparison does not meet the criterion, continuing to operate in the first mode.

In some embodiments, the first color metric value includes an average color metric value from a set of colors in the detection window.

In some embodiments, generating the second image of pixels includes: connecting pixels that include the second color metric value that meets the first color metric value within the threshold together to form the second image of pixels.

In some embodiments, generating the second image of pixels includes: stopping the connecting of pixels when no more pixels that include the second color metric value meet the first color metric value within the threshold are neighboring to pixels that form the second image of pixels.

In some embodiments, comparing the second image to the object includes: determining whether the second image is similar to the object within a second threshold.

In some embodiments, comparing the second image to the object includes: not using the one or more second color metric values to determine whether the second image is similar to the object within a second threshold.

In some embodiments, the instructions are further operable for: calculating a third color metric value from the detection window in a second image that is detected by the visual system; continuing to operate in the first mode when a probability that the third color metric would result in a comparison that would not meet the criterion is above a second threshold.

In some embodiments, an apparatus comprising: one or more computer processors; and a computer-readable storage medium comprising instructions for controlling the one or more computer processors to be operable for: calculating a first color metric value from a detection window in a first image that is detected by a visual system; generating a second image of pixels, wherein the pixels in the second image of pixels include one or more second color metric values that meet the first color metric value within a threshold; comparing the second image of pixels to an object; when the comparison meets a criterion, transitioning from a first mode to a second mode; and when the comparison does not meet the criterion, continuing to operate in the first mode.

In some embodiments, generating the second image of pixels includes: connecting pixels that include the second color metric value that meets the first color metric value within the threshold together to form the second image of pixels.

In some embodiments, generating the second image of pixels includes: stopping the connecting of pixels when no more pixels that include the second color metric value meet the first color metric value within the threshold are neighboring to pixels that form the second image of pixels.

System

Figure 8:
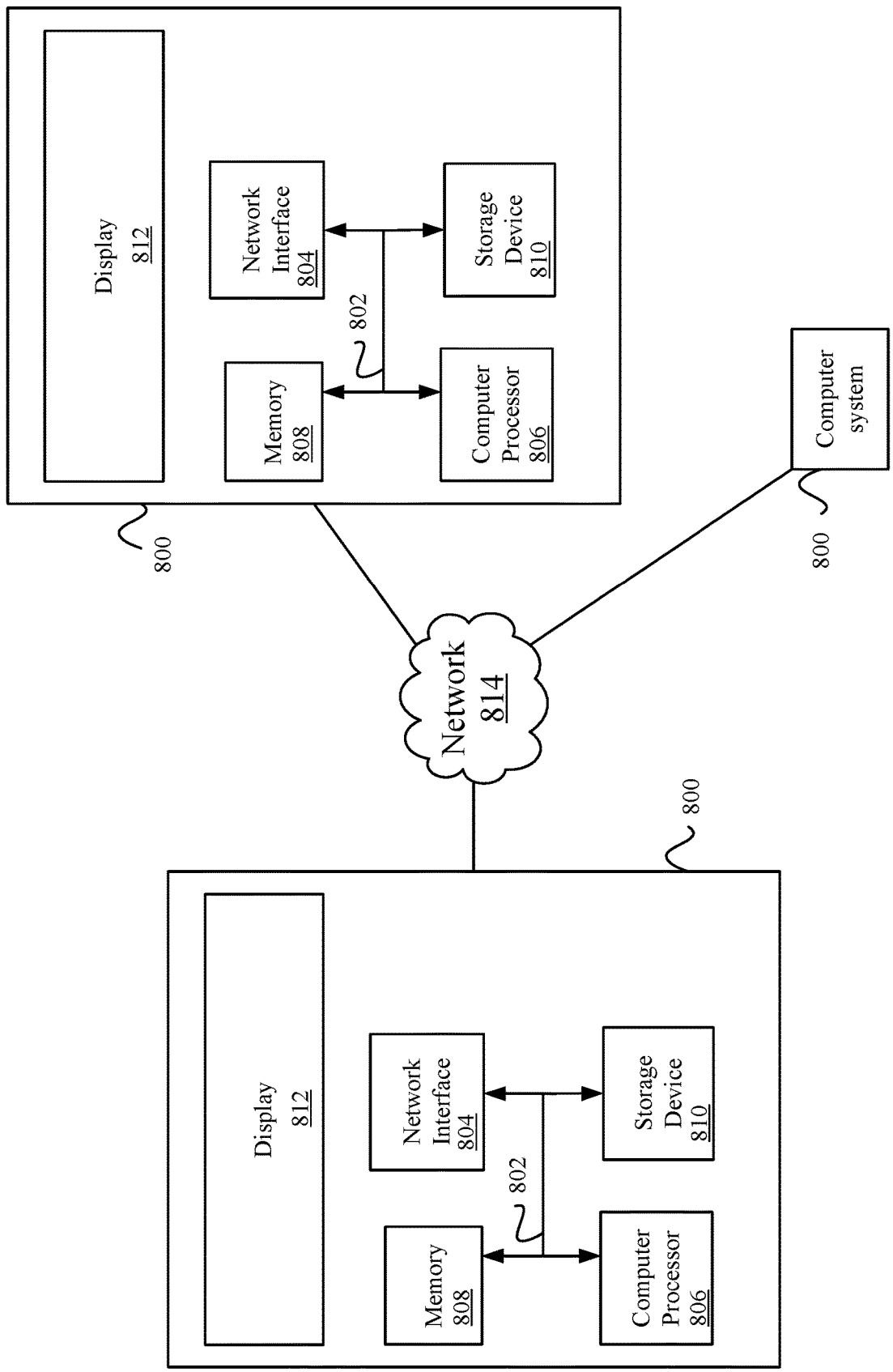
FIG. 8 illustrates an example of special purpose computer systems according to some embodiments.

FIG. 8 illustrates an example of special purpose computer systems 800 according to some embodiments. Only one instance of computer system 800 will be described for discussion purposes, but it will be recognized that computer system 800 may be implemented for other entities. Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of some embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by some embodiments. The instructions, when executed by one or more computer processors 806, may be configured to perform that which is described in some embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of some embodiments may be distributed across computer systems 800 through network 814.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method for operating a computing device, the method comprising:
    calculating, by the computing device, a first color metric value for a detection window applied to a first image that is detected by the computing device, the detection window having a size or a location that is based on an object a user of the computing device is interested in determining whether the object is in the first image;
    generating, by the computing device, from the first image, a second image having pixels with second color metric values that meet the first color metric value within a threshold;
    analyzing, by the computing device, the pixels of the second image to determine whether the pixels of the second image visually represent the object;
    when the pixels of the second image are determined to visually represent the object, transitioning, by the computing device, from a first mode to a second mode; and
    when the pixels of the second image are determined to not visually represent the object, continuing, by the computing device, to operate in the first mode.

2. The method of claim 1, wherein the first color metric value comprises an average color metric value from a set of colors in the detection window.

3. The method of claim 1, wherein the detection window is a predefined section within the first image.

4. The method of claim 1, wherein the generating of the second image comprises:
    connecting pixels of the first image that include the second color metric values that meet the first color metric value within the threshold together.

5. The method of claim 4, wherein the generating of the second image comprises:
    stopping the connecting of pixels of the first image when no more pixels of the first image that include the second color metric values that meet the first color metric value within the threshold are neighboring to the pixels of the first image used to form the second image.

6. The method of claim 1, wherein the generating of the second image comprises:
    selecting a first pixel of the first image that includes one of the second color metric values that meets the first color metric value within the threshold;
    analyzing a first set of pixels of the first image that are coupled to the first pixel of the first image to determine a second set of pixels of the first image from the first set of pixels that include one or more of the second color metric values that meet the first color metric value within the threshold; and
    including the second set of pixels of the first image as part of the second image.

7. The method of claim 6, wherein the generating of the second image comprises:
    selecting a third set of pixels of the first image from the first set of pixels of the first image that include one or more of the second color metric values that do not meet the first color metric value within the threshold; and
    excluding the third set of pixels of the first image from the second image.

8. The method of claim 6, wherein the generating of the second image comprises:
    selecting each of the second set of pixels of the first image;
    for each of the second set of pixels, analyzing a third set of pixels of the first image that are coupled to each of the second set of pixels to determine a fourth set of pixels of the first image from the third set of pixels that include one or more of the second color metric values that meet the first color metric value within the threshold; and
    including the fourth set of pixels of the first image as part of the second image.

9. The method of claim 1, wherein the analyzing of the pixels of the second image to determine whether the pixels of the second image visually represent the object comprises:
    transforming the second image to a binary image; and
    analyzing the binary image to determine whether the binary image visually represents the object.

10. The method of claim 1, wherein the analyzing of the pixels of the second image to determine whether the pixels of the second image visually represent the object comprises:
    resizing the second image; and
    analyzing the resized second image to determine whether the resized second image visually represents the object.

11. The method of claim 1, wherein the analyzing of the pixels of the second image to determine whether the pixels of the second image visually represent the object comprises:
    determining whether the pixels of the second image are similar to the object within a second threshold.

12. The method of claim 1, further comprising:
    calculating a third color metric value for the detection window applied to a third image;
    determining a probability of an analysis of a fourth image, generated from the third image as the second image is generated from the first image and analyzed, would not indicate the fourth image visually represents the object; and continuing to operate in the first mode when the probability of the analysis of the fourth image would not indicate the fourth image visually represents the object is above a second threshold.

13. The method of claim 1, wherein:
the object is a gesture, and
the first mode is a locked mode and the second mode is an unlocked mode.

14. A non-transitory computer-readable storage medium having stored thereon a plurality of instructions, which in response to execution of the instructions by a computer device, cause the computer device to:

calculate a first color metric value for a detection window applied to a first image that is detected by the computer device, the detection window having a size or a location that is based on an object a user of the computer device is interested in determining whether the object is in the first image;

generate, from the first image, a second image having pixels with second color metric values that meet the first color metric value within a threshold;

analyze the pixels of the second image to determine whether the pixels of the second image visually represent the object;

when the pixels of the second image are determined to visually represent the object, transition from a first mode to a second mode; and when the pixels of the second image are determined to not visually represent the object, continue to operate in the first mode.

15. The non-transitory computer-readable storage medium of claim 14, wherein the first color metric value comprises an average color metric value from a set of colors in the detection window.

16. The non-transitory computer-readable storage medium of claim 14, wherein to generate the second image, comprises:

to connect pixels of the first image that include the second color metric values that meet the first color metric value within the threshold together.

17. The non-transitory computer-readable storage medium of claim 16, wherein to generate the second image comprises:

to stop the connecting of pixels of the first image when no more pixels of the first image that include the second color metric values that meet the first color metric value within the threshold are neighboring to the pixels of the first image used to form the second image.

18. The non-transitory computer-readable storage medium of claim 14, wherein to analyze the pixels of the second image to determine whether the pixels of the second image visually represent the object comprises:

to determine whether the second image visually represents the object within a second threshold.

19. The non-transitory computer-readable storage medium of claim 14, wherein the computer device is further caused to:

calculate a third color metric value for the detection window applied to a third image;

determine a probability of an analysis of a fourth image, generated from the third image as the second image is generated from the first image and analyzed, would not indicate the fourth image visually represents the object; and continue to operate in the first mode when the probability of the analysis of the fourth image would not indicate the fourth image visually represents the object is above a second threshold.

20. An apparatus comprising:
one or more computer processors; and
a non-transitory computer-readable storage medium comprising instructions for controlling the one or more computer processors to cause the apparatus to:

calculate a first color metric value for a detection window applied to a first image that is detected by the apparatus, the detection window having a size or a location that is based on an object a user of the apparatus is interested in determining whether the object is in the first image;

generate, from the first image, a second image having pixels with second color metric values that meet the first color metric value within a threshold;

analyze the pixels of the second image to determine whether the pixels of the second image visually represent the object;

when the pixels of the second image are determined to visually represent the object, transition from a first mode to a second mode; and when the pixels of the second image are determined to not visually represent the object, continue to operate in the first mode.

21. The apparatus of claim 20, wherein to generate the second image comprises:

to connect pixels of the first image that include the second color metric value that meets the first color metric value within the threshold together.

22. The apparatus of claim 21, wherein to generate the second image comprises:

to stop the connecting of pixels of the first image when no more pixels of the first image that include the second color metric values that meet the first color metric value within the threshold are neighboring to the pixels of the first image used to form the second image.

* * * * *